Figure 1:
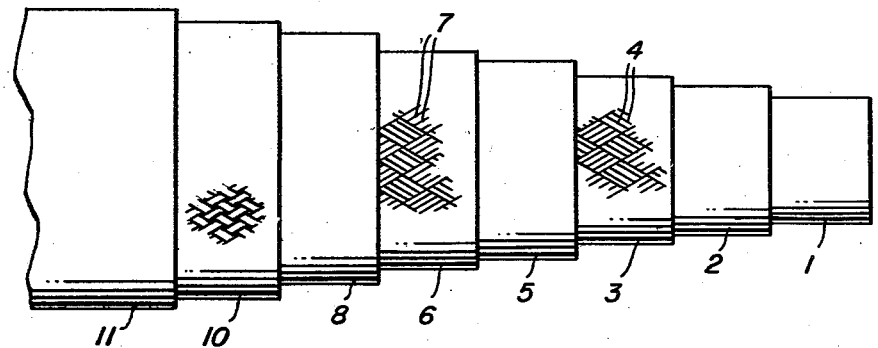

Dec. 3, 1963     R. E. CONNOR ETAL     3,112,772
ELASTOMERIC COMPOSITION AND METHOD OF BONDING
ELASTOMERS TO FERROUS AND LIKE METALS
Filed Feb. 9, 1961

INVENTORS.
RICHARD E. CONNOR
JOHN C. KITCHING

BY
ATTORNEY

United States Patent Office 3,112,772
Patented Dec. 3, 1963

3,112,772
ELASTOMERIC COMPOSITION AND METHOD OF BONDING ELASTOMERS TO FERROUS AND LIKE METALS
Richard E. Connor, Haddonfield, N.J., and John C. Kitching, Philadelphia, Pa., assignors to H. K. Porter Company, Inc., Pittsburgh, Pa., a corporation of Delaware
Filed Feb. 9, 1961, Ser. No. 88,152
3 Claims. (Cl. 138—138)

This invention relates primarily to effecting a bonding relationship between certain elastomeric materials, which term is herein used to designate rubber-like materials generally and certain metals of the iron group, including iron and its alloys.

Uncured elastomeric materials, such as natural and synthetic rubbers and the like, tend to adhere to solids of many kinds when brought into contact therewith and when cured by heat while thus in contact may become tenaciously inseparable therefrom without disintegration. This kind of attachment or union between dissimilar materials we hereinafter refer to as bonding to distinguish from mere adherence in which the materials may be held together, with or without an interposed adhesive, but be capable of separation without damage to either.

In heavy duty flexible hose reinforced with metal wires in which the braided or woven wire reinforcement is interposed between layers of elastomeric material it is especially important that the elastomeric material be bonded to the wires, since when it is united therewith by adherence, without bonding, or the wires are merely enclosed within the elastomeric materials, internal stresses introduced into the hose while in service may separate the wires from the elastomeric material and thus bring about premature deterioration of the hose; prior, however, to the present invention it has been difficult, if not impossible, to prevent at least localized separation of that character.

It has been a usual practice in the manufacture of such hose to apply to an extruded elastomeric inner tube an "insulating" layer of uncured elastomeric material, to form over the latter a reinforcement of steel wires usually braided or woven under tension to partially embed them in the first insulating layer, then to apply over the wires successively another elastomeric insulating layer, a second wire reinforcement, then a third such insulaing layer and finally one of fabric which may or may not be covered with an outer elastomeric layer, following which the elastomeric components are heat-cured.

It is a principal object of the present invention to provide an elastomeric composition especially adapted for incorporation in wire-reinforced hose of the character aforesaid which during heat curing in contact with the ferrous metal of the reinforcing wires forms an electrochemical bond therewith such that union of the cured elastomer with the metal is as great as or greater than the strength of the elastomer itself.

A further object is the provision of a method for uniting ferrous metal or the like with an elastomeric component to securely and practically inseparably bond them together to thereby inhibit their separation without at least partial destruction of one or both of them.

Another object is to provide a wire reinforced hose in which wires are embedded in elastomeric material to form the hose wall and during curing of the said material by heat they become substantially inseparably bonded thereto whereby premature deterioration of the hose in service due to separation of its elastomeric components from its wire reinforcement is substantially eliminated and the useful life of the hose thereby substantially prolonged as compared with hose in which no such bonding is present.

Figure 2:
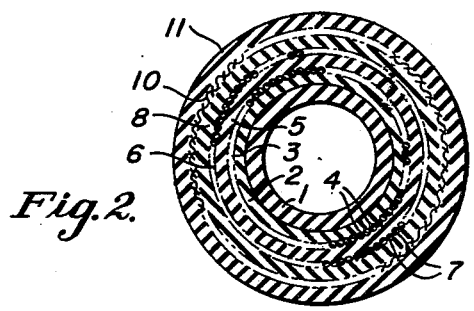
Figure 3:
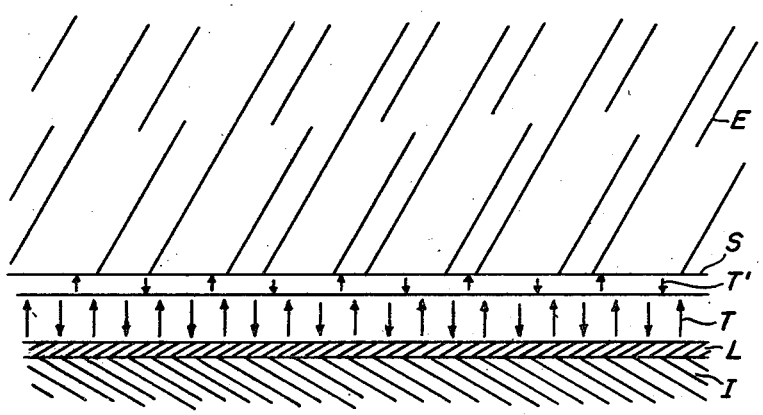

Other purposes, objects and advantages of the invention will hereinafter more fully appear or will be understood from the following description of a preferred elastomeric composition embodying it together with a disclosure of the presently best known method of performing the several steps incident to the manufacture in accordance with the invention of a product, namely a wire reinforced hose, comprising ferrous metal in intimate contact with and bonded to such elastomeric composition, reference being hand to the accompanying drawing in which:

FIG. 1 is a fragmentary side elevation of a portion of a steel wire reinforced hose, broken away at several transverse planes to illustrate separately the corresponding layers of material comprised in it;

FIG. 2 is a transverse section of the hose in which the radial thicknesses of the layers are somewhat exaggerated and are not necessarily on the same scale, and FIG. 3 is a greatly magnified schematic diagram corresponding generally to a micrograph of a portion of the hose wall at the ferrous metal-elastomer inter-face illustrating an assumed molecular or ionic migration which may afford a chemical rationalization for the bonding of such materials in the practice of the invention.

Referring now more particularly to the drawing, there is illustrated in FIGS. 1 and 2 a typical wire reinforced hydraulic hose comprising an inner preferably extruded elastomeric tube 1 surrounded by an elastomeric insulating layer 2 in turn enclosed within a reinforcement 3 composed of woven or braided ferrous metal wires 4 about which is disposed a second insulating layer 5 overlaid by a second reinforcement 6 of similar wires 7, an outer insulating layer 8 of elastomeric material, a woven or braided textile fabric layer 10 and an outer elastomeric cover 11. It will be understood, however, that a hose produced in accordance with the invention is not restricted to any specific number of layers of the several materials employed and as indicated above their relative thicknesses may not correspond to the dimensions of the drawing, while articles other than hose including ferrous metal-elastomer bonds may be made in general correspondence to the principles utilized in hose manufacture as herein set forth.

In assembling the several layers of materials in their desired relation to each other any suitable procedure may be followed as for example, but not by way of limitation, placing the extruded inner tube 1 in either uncured or partially cured state on a suitable elongated cylindrical mandrel (not shown and forming no part of the invention), then applying over it by extrusion or otherwise layer 2 of elastomeric insulating material compounded as hereinafter described, passing the assembly through a braider or circular loom (not shown) for application of the first ferrous metal wire reinforcing layer 3, then preferably by the same procedure as used for applying layer 2 the second insulating layer 5, followed by the second ferrous metal wire reinforcement 6 and successively forming by generally similar procedures the remaining layers, a suitable adhesive cement desirably being applied to the outer fabric layer 10 before the cover 11.

All the elastomeric constituents of the hose at this stage being in uncured or not more than partially cured state, the mandrel-hose assembly is tightly wrapped in a fabric tape, preferably one made from nylon, to exert temporary radial inward pressure on the hose components and while so compressed they are heated, as by introducing high pressure steam into the mandrel or by passing the assembly into a chamber heated to about 298° F. and maintaining it therein for the period of time, for example one hour, requisite to complete the cure of the elastomeric components, following which the hose is cooled and the nylon tape and mandrel removed, the hose then being ready to receive the usual end couplings preparatory to its being placed in service.

The mechanical steps incident to manufacture of the hose as just described are not substantially different from generally corresponding ones which have been employed in the industry but so far as we are aware they have not been used in the manufacture of hose from elastomeric materials having the capacity for electrochemically bonding to ferrous metals; the elastomeric composition we prefer to employ will now be described in greater detail.

The said composition contains as the principal rubber hydrocarbon ingredient a polychloroprene such as neoprene, marketed by E. I. du Pont de Nemours Co., of Wilmington, Delaware, and to 100 parts of it by weight we add the following, blending the several ingredients together in such manner as to produce a composition physically and chemically uniform throughout:

| | Parts |
|---|---|
| Calcined magnesia | 10 |
| Hydrated calcium silicate (precipitated) | 30 |
| Kaolin | 20 |
| Lead acetate | 10 |
| Titanium dioxide | 10 |
| Low M.W. polyethylene, M.P. 170° F.–200° F | 5 |
| Zinc oxide | 5 |
| Sulfur | 2 |
| Diphenylguanidine | .5 |
| Tetramethyl thiuram monosulfide | .5 |
| 2-mercapto imidazoline | .5 |
| Tetremethylthiuram disulfide | .5 |
| Light process oil (naphthinic type) | 10 |
| Stearic acid | .5 |
| Diphenylamine diisobutylene | 2 |
| | 106.5 |

For the lead acetate in the above formula an equal quantity of lead subacetate or lead carbonate may be substituted in whole or in part, the permissible range of the quantity of such salts appearing to be from about 10 to about 25 parts by weight to 100 parts of the synthetic rubber used in the formulation of the compound.

With the salt or salts uniformly dispersed in the compound prior to vulcanization, however, when vulcanizing heat is applied at the elastomer-ferrous metal inter-face a chemical reaction appears to occur in accordance with a theory pertaining to the electromotive series of metals, to wit, any element in the electromotive series will react with or displace the ions of any element below it in the series. It therefore is assumed that in accordance with this theory a reaction occurs between the ferrous metal and the lead acetate, subacetate or carbonate in the semi-fluid or relatively low viscosity elastomer as it is initially heated and before curing has been attained substantially in accordance with one or more of the following equations:

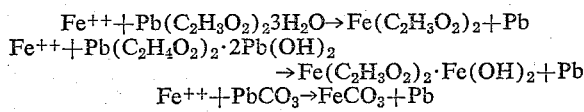

This relative fluidity of the elastomer as the temperature rises toward a vulcanizing or curing one and before full curing occurs facilitates, it is believed, the migration of ions to effect the replacement indicated and in FIG. 3 an attempt has been made to show how this migration may occur. Thus considering the wire reinforcement as the underlying iron layer I to which an elastomer E containing one or more of the lead salts above mentioned uniformly dispersed through it is brought into intimate contact, on heating the salt molecules immediately in contact with the iron become dissociated to allow ferrous iron ions to replace the lead ions, which are thereupon deposited on the surface of the ferrous metal; as the reaction proceeds, therefore, a thin plating of lead L accumulates on the metal and a transition zone T immediately beyond it contains the ferrous salt in somewhat higher proportion than the unreacted lead salt. Beyond transition zone T there is a lesser migration of ferrous ions and the lead salt therefore predominates in relation thereto throughout this zone T' which has as its outer limit a boundary designated the shear point S where the concentration of ferrous salt falls to zero and beyond which the compound having the original composition and unaffected by the reaction just described remains.

It is believed this boundary marking the outer limit of ferrous ion migration is the area in which separation of the compound occurs when tested to destruction for its adhesion to the underlying ferrous metal since it has been observed after such tests that some of the elastomer remains tenaciously united to the ferrous metal in a bond stronger than the cohesiveness of the elastomer itself and when this elastomeric residue is removed as by a solvent or scraping, lead plating L composed of elemental lead displaced from the lead salt initially contained in the elastomeric compound remains on the ferrous metal.

It will be recognized by those skilled in the art that several ingredients of the elastomeric compound herein described are substances often used in compounding elastomeric compositions and include accelerators, fillers, neutralizers, plasticizers and minor ingredients introduced to perform functions comparable to those they perform in known elastomeric compounds being unaffected by the lead salt introduced in accordance with our invention and so far as is known taking no specific part in bonding the compound to the ferrous metal base.

The specific composition of the latter does not appear materially to affect the reaction provided it is predominantly iron and its surface free of organic or oxide contaminants and it may be that in the presence of certain alloying elements, particularly nickel, cobalt and/or cadmium in, or even predominant in it, it may react in the same manner as iron with the lead ions, since these elements lie between ferrous iron and bivalent lead in the said electromotive force series.

In order more clearly to identify the functions of the several ingredients included in the above formula it may be noted that the calcined magnesia acts as a stabilizer and also, in part by helping to neutralize acidity resulting from replacement of lead by iron in the lead acetate or carbonate as the case may be, contributes to the curing of the rubber when it is heated.

The hydrated calcium silicate and kaolin are primarily filling and reinforcing agents as to some extent is also the titanium dioxide, which in addition serves as a white pigment to enhance the light reflectivity of the composition. The polyethylene is included to minimize adherence of the composition to mill and/or calender rolls when it is being worked thereon, while zinc oxide and sulfur are vulcanizing agents; diphenylguanidine, tetramethylthiuram mono- and di-sulfides, 2-mercapto imidazoline and to some extent stearic acid are accelerators which hasten the curing process, the last also having function as an activator while the processing oil tends to decrease internal friction during milling and calendering and diphenylamine diisobutylene acts as an antioxidant. These several classes of ingredients are well known in the industry and for specific purposes their proportions may be varied within their respective classes and in relation to the rubber hydrocarbon selected which, according to our present knowledge instead of neoprene may be natural rubber butadiene styrene, chlorosulfonated polyethylene or isobutylene, although we deem compositions exclusively or predominantly of butadiene acrylonitrile unsuitable for use in our invention.

In testing the rubber made in accordance with the formula stated and cured in contact with steel with the same composition except for omisison of the lead aceate used as a control, we find the response to the standard "90° L" peel test improved by the presence of the lead acetate in the proportion stated in the ratio of 35:12, or almost triple the bond strength of the control.

It is our belief already indicated that the displacement of lead ions by ferrous iron during curing, accompanied by deposition of metallic lead on the ferrous metal, occurs during the preliminary stages of the curing process when the rubber composition is in semi-fluid state but before a temperature has been attained such as to tend to cause spontaneous disintegration or decomposition of lead acetate, subacetate or carbonate as the case may be, and that the ferrous aceate molecules formed in the composition are retained therein substantially in a state of solid solution as curing of the rubber proceeds and its fluidity correspondingly lessens. We are not prepared to explain in detail, however, the precise chemical and physical changes which occur during the curing cycle although we consider it unlikely that all the lead salt in the composition is either converted to the corresponding ferrous salt or decomposed and that some probably remains in the composition unaltered, while any which is decomposed cannot unduly increase the acidity of the composition because the calcined magnesia present tends to neutralize any free acidic radicals and so does not adversely affect the properties of the composition.

We have herein set forth with considerable particularity one mode of practising our invention in production of a wire-reinforced hose and have suggested certain variations and modifications we consider within its contemplation, but we do not desire or intend that use of the invention be limited or confined to hose manufacture in any way as it may be employed in production of other articles while other changes and modifications in procedure as well as in the specified ingredients used and in their proportions in the composition will readily occur to those skilled in the art and may be utilized if desired without departing from the spirit and scope of the invention as defined in the appended claims.

Having thus described our invention, we claim and desire to protect by Letters Patent of the United States:

1. A hose comprising a tubular layer of an elastomeric composition containing a substantial proportion of a polychloroprene a ferorus salt and a bivalent lead salt, each of said salts comprising an organic acid radical of not more than four carbon atoms, and ferrous wires bonded to said first layer and carrying on their surfaces in contact therewith a deposit of metallic lead.

2. A hose comprising a tubular layer of an elastomeric composition containing a substantial proportion of a polychloroprene and from 10% to 25% of an organic lead salt of not more than four carbon atoms and a ferrous metal wire reinforcement, said elastomeric composition being cured and bonded to the wire of said reinforcement through an interposed film of metallic lead.

3. A hose comprising a tubular layer of an elastomeric composition containing a substantial proportion of a polychloroprene, from 10% to 25% of an organic salt of bivalent lead and not more than four atoms of carbon and a wire reinforcement made of a ferrous metal, said elastomeric composition being cured and bonded to the wire of said reinforcement through an interposed film of metallic lead and said elastomeric composition adjacent said wire containing said salt in lower concentration than in zones remote from said wire.

References Cited in the file of this patent

UNITED STATES PATENTS

| | | |
|---|---|---|
| 2,140,518 | Doolittle | Dec. 20, 1938 |
| 2,141,126 | Doolittle | Dec. 20, 1938 |
| 2,173,359 | Freedlander | Sept. 19, 1939 |
| 2,544,119 | Wolfe | Mar. 6, 1951 |
| 2,943,073 | Brantley | June 28, 1960 |
| 2,945,834 | Coulter et al. | July 19, 1960 |